(12) United States Patent
Tsuruta et al.

(10) Patent No.: US 6,398,292 B2
(45) Date of Patent: Jun. 4, 2002

(54) VEHICLE BODY STRUCTURE FOR IMPROVED CRASH SAFETY

(75) Inventors: Makoto Tsuruta; Takahiro Kamei; Yasuki Motozawa; Kazuya Yoshida, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/729,973

(22) Filed: Dec. 6, 2000

(30) Foreign Application Priority Data

Dec. 6, 1999 (JP) ............................... 11-345999
Dec. 6, 1999 (JP) ............................... 11-346005

(51) Int. Cl.$^7$ ............................................. B62D 23/00
(52) U.S. Cl. ..................... 296/189; 296/68.1; 296/188; 296/204
(58) Field of Search ................. 296/188, 189, 296/193, 194, 195, 196, 203.01, 203.02, 203.04, 204, 205, 68.1

(56) References Cited

U.S. PATENT DOCUMENTS 6,186,574 B1 * 2/2001 Motozawa et al. ........ 296/68.1
6,193,296 B1 * 2/2001 Motozawa et al. ........ 296/68.1
6,254,164 B1 * 7/2001 Kawamura et al. ........ 296/68.1

FOREIGN PATENT DOCUMENTS

JP          A-7-101354          4/1995

\* cited by examiner

*Primary Examiner*—Joseph D. Pape
*Assistant Examiner*—Lori L Coletta
(74) *Attorney, Agent, or Firm*—Arent Fox Kintner Plotkin & Kahn, PLLC (57) ABSTRACT

In an automotive vehicle body structure including a crash load transmitting member extending from a front end of the vehicle body to a part adjacent to the floor member, and integrally carrying a seat thereon, a stopper is fixedly attached to the main frame, and adapted to abut a part of the crash load transmitting member upon a rearward movement of the crash load transmitting member by a prescribed distance. A guide member normally retains the crash load transmitting member firmly to the vehicle body main frame as a part of the vehicle body, but allows the crash load transmitting member to move rearward, and hit the stopper so that the desired deceleration time history may be achieved in the crash load transmitting member which is integral with the seat, and the deceleration of the vehicle occupant may be favorably controlled.

11 Claims, 10 Drawing Sheets

VEHICLE BODY STRUCTURE FOR IMPROVED CRASH SAFETY

TECHNICAL FIELD

The present invention relates to an automotive vehicle body structure for improving the crash safety of the vehicle.

BACKGROUND OF THE INVENTION

It has been proposed to control the deceleration of the passenger compartment of a vehicle by appropriately selecting the deformation mode of the part of the vehicle body other than the passenger compartment at the time of a vehicle crash, and prevent the deformation of the vehicle body from reaching the passenger compartment as a part of efforts to increase the protection of the vehicle occupants at the time of a vehicle crash (see Japanese patent laid open publication No. 7-101354 and others).

In view of reducing the injury to the vehicle occupant at the time of a vehicle crash, it is important to note that there is a delay in the deceleration of the vehicle occupant with respect to the deceleration of the vehicle body because the passenger restraint system such as a seat belt acts like a spring at the time of a vehicle crash, and the peak of the vehicle occupant deceleration occurs at the time of the maximum elongation of the spring although the vehicle body deceleration remains constant. Furthermore, this peak is significantly greater than the average deceleration of the vehicle body because the vehicle occupant reduces its speed in a shorter period of time than the main part of the vehicle body. Therefore, to reduce the maximum level of the vehicle occupant deceleration, it is necessary not only to reduce the average deceleration of the vehicle body but also to reduce the overshoot of the vehicle occupant deceleration due to the action of the restraint system as a spring.

Figure 14:
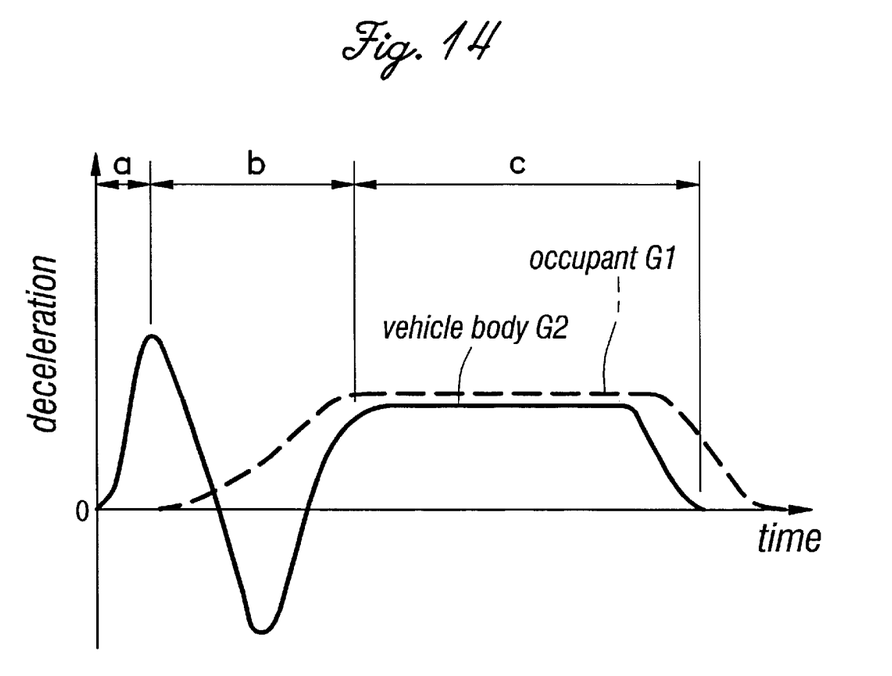
FIG. 14 is a graph showing the desired time histories of deceleration of the vehicle body and vehicle occupant.

In view of reducing the injury to the vehicle occupant, the waveform of the vehicle body deceleration is highly important. FIG. 14 shows a waveform of the vehicle body deceleration G2 which can minimize the vehicle occupant deceleration G1 according to the foregoing considerations. The vehicle body deceleration G2 in this case means the deceleration of the part of the vehicle body to which the seat is attached. As shown by the solid line, a deceleration level higher than the average deceleration is produced for a prescribed (short) time period in an initial phase (interval a in the drawing), and an opposite deceleration is produced for a short time period (interval b in the drawing) before the vehicle body starts decelerating at the average deceleration (interval c in the drawing). It has been confirmed by simulations conducted by the inventors that such a time history of the vehicle body deceleration is effective in reducing the overshoot of the vehicle occupant deceleration particularly owing to the reverse deceleration in interval b, and the vehicle occupant deceleration G1 can be significantly reduced as compared to the case of a constant deceleration (rectangular wave) for a given distance for deceleration (dynamic stroke).

For more details of vehicle body structures based on the foregoing concept, reference should be made to copending U.S patent applications Ser. Nos. 09/376,098 filed Aug. 17, 1999, 09/377,366 filed Aug. 18, 1999, 09/376,888 filed Aug. 18, 1999, 09/621,411 filed Jul. 21, 2000 (our ref: F684), 09/627,969 filed Jul. 28, 2000 (our ref: F685) 09/621,336 filed Jul. 21, 2000, 09/608,669 filed Jun. 30, 2000, 09/648,190 filed Aug. 23, 2000 (our ref: F688). The contents of these copending patent applications are hereby incorporated in the present application by reference.

BRIEF SUMMARY OF THE INVENTION

The present invention is intended to improve previous proposals made in connection with the vehicle body structure based on the above described concept, and a primary object of the present invention is to provide a vehicle body structure which can favorably control the deceleration of the vehicle body supporting the vehicle seat at the time of a frontal vehicle crash so that the maximum deceleration of the vehicle occupant may be reduced.

A second object of the present invention is to provide a vehicle body structure based on the above described concept which is simple in structure, and requires minimum changes from the existing vehicle body design.

A third object of the present invention is to a vehicle body structure based on the above described concept which adds very little weight to the existing vehicle body design.

A fourth object of the present invention is to a vehicle body structure based on the above described concept which can produce a highly desirable deceleration time history for the vehicle seat at the time of a vehicle crash.

According to the present invention, such objects can be accomplished by providing an automotive vehicle body structure, comprising: a vehicle body main frame including a floor member defining a floor of a passenger compartment, a dashboard panel extending upright from a front end of the floor member, and a pair of front side beams extending between a front end of the vehicle body and the dashboard panel; a crash load transmitting member extending from a front end of the vehicle body to a part adjacent to the floor member; a vehicle seat connected to the crash load transmitting member; a guide member attached to the main frame for normally fixedly securing the crash load transmitting member but allowing the crash load transmitting member to move rearward of the vehicle body when the crash load transmitting member is subjected to a rearward force exceeding a prescribed threshold level; and a stopper which is fixedly attached to the main frame, and adapted to abut a part of the crash load transmitting member upon a rearward movement of the crash load transmitting member by a prescribed distance; the prescribed threshold level being smaller than a level that will cause a collapsing deformation of the crash load transmitting member.

Thus, the guide member normally retains the crash load transmitting member, which may comprise a sub frame for supporting an engine and/or a wheel suspension system, firmly to the vehicle body main frame as a part of the vehicle body, but allows the crash load transmitting member to move rearward, and hit the stopper so that the desired deceleration time history may be achieved in the crash load transmitting member which is integral with the seat so that the deceleration of the vehicle occupant may be favorably controlled.

Typically, the part of the vehicle body structure adjacent to the front dashboard panel is relatively rigid as compared to the rear end of the vehicle body so that an effective stopper can be formed in this part without requiring any special enforcement.

For even more efficient utilization of the material for the vehicle body, the guide member may be located adjacent to a lower end of the dashboard panel, and an enlarged part is provided in a part of the crash load transmitting member ahead of the guide member by the prescribed distance so that the guide member may serve as the stopper which abuts the enlarged part as the crash load transmitting member moves rearward by the prescribed distance. Thus, the weight increase that is required for improved crash safety can be minimized.

To achieve a highly favorable time history of the deceleration of the crash load transmitting member, particularly at the time the crash load transmitting member collides with the stopper, a cushioning member may be provided between the stopper or the guide member and the enlarged part of the crash load transmitting member. The cushioning member may consist of either a plastically collapsible extension of the enlarged part or a plastically collapsible extension of the guide member.

The retaining force of the guide member in retaining the crash load transmitting member can be easily attained by forming the guide member with a channel shaped bracket which surrounds a part of the crash load transmitting member so as to achieve a prescribed frictional retaining force. The frictional force can be suitably adjusted by using a suitable frictional lining or controlling the force used for fastening the guide member.

Alternatively, the guide member may comprise a rod which is passed through a longitudinal slot formed in one of the main frame and the crash load transmitting member and secured to the other of the main frame and the crash load transmitting member so as to achieve a prescribed frictional retaining force.

The guide may also comprise a rod which extends in the fore-and-aft direction from one of the main frame and the crash load transmitting member, and a hole formed in the other of the main frame and the crash load transmitting member to receive and retain the rod with a prescribed retaining force.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
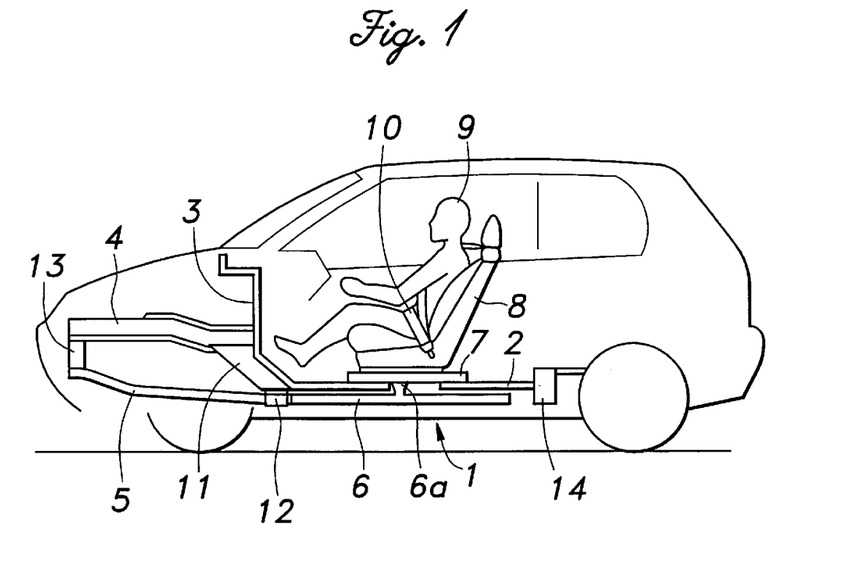
FIG. 1 is a schematic side view of an automotive vehicle body structure embodying the present invention.
Figure 2:
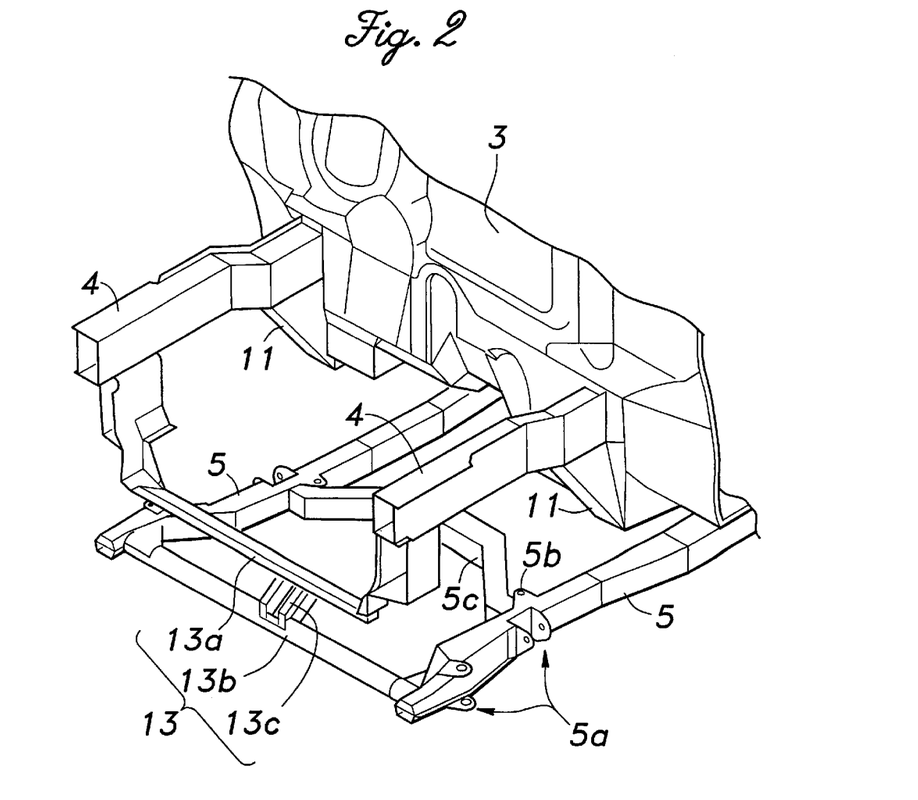
FIG. 2 is a fragmentary perspective view of a front part of the vehicle body structure shown in FIG. 2.

FIG. 1 is a schematic side view of a vehicle body structure embodying the present invention. The main frame 1 of the vehicle body comprises a floor member 2 defining a floor of a passenger compartment, a dashboard panel 3 extending upright from the front end of the floor member 2, and a pair of front side beams 4 extending from the dashboard panel 3 to the front end of the vehicle body on either side of thereof. The dashboard panel 3 defines a rear end of an engine room and a front end of the passenger compartment. As best shown in FIG. 2, a sub frame 5 is provided in a lower part of the engine room, and a front end of the sub frame 5 is joined to the front end of the front side beams 4 by a front member 13 including a pair of lateral members 13a and 13b and a vertical member 13c while the rear end of the sub frame 5 is integrally connected to a pair of connecting members 6 which extend rearward under the floor member 2 although only one of them is shown in FIG. 1. In this embodiment, the sub frame 5 forms a crash load transmitting member jointly with the connecting members 6 as described hereinafter.

An intermediate part of each of the connecting members 6 is integrally provided with an upright member 6a which is passed into the passenger compartment through a hole formed in the floor member 2. The upper end of the upright member 6a is attached to a seat base 7 supporting the lower surface of a seat 8. The two connecting members 6 having an identical structures are disposed on either side of the vehicle body, but only one of them is described in the following for the convenience of description. The seat 8 is slidably supported by the seat base 7 via guide rails (not shown in the drawings) fixedly attached to the seat base 7 so that the seat 8 can move in the fore-and-aft direction relative to the seat base 7 and the floor member 2 for adjustment. The seat 8 is incorporated with a seat belt 10 having three ends which are all anchored to the seat 8 so as to effectively restrain a vehicle occupant 9 in the seat 8 without regard to the fore-and-aft position of the seat 8. The seat belt may also consist of a more conventional seat belt having one or two of the anchor points which are attached to the vehicle body.

Figure 3:
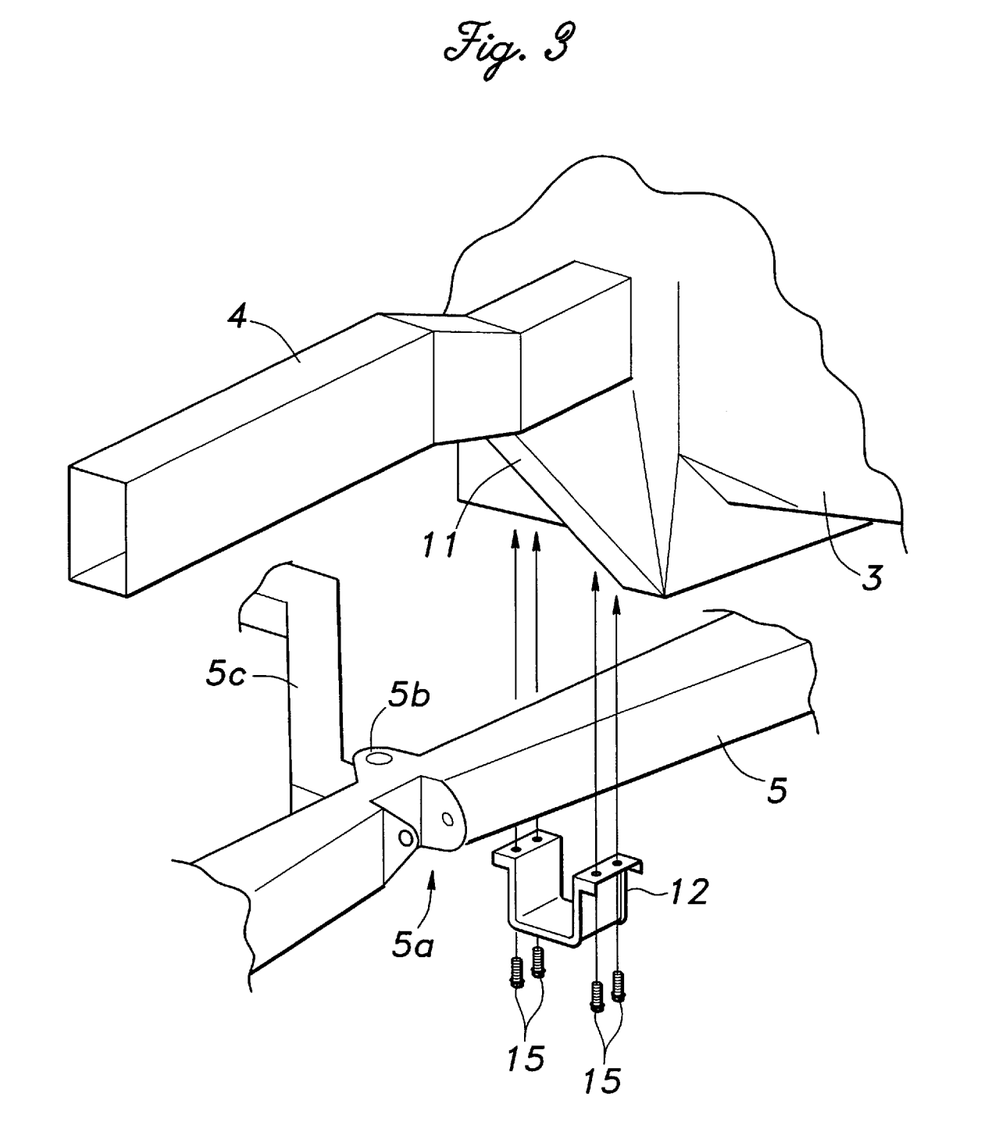
FIG. 3 is an exploded perspective view of an essential part of the first embodiment of the present invention.

A pair of floor frame members 11 are fixedly attached to the lower surface of a corner defined between the floor member 2 and the front dashboard panel 3 on either side of the vehicle body to reinforce the part connecting the front side beams 4 with the front dashboard panel 3. A holder 12 made of stamp formed sheet metal having a rectangular cross section in the shape of letter C is fixedly attached to the lower surface of each of the floor frame members 11 by using threaded bolts 15 as shown in FIG. 3. The end of the sub frame 5 facing the passenger compartment is retained by the holders 12 which are fixedly attached to the lower surfaces of the corresponding floor frame members 11.

The sub frame 5 is integrally provided with a bracket 5a on each side for supporting a wheel suspension system (not shown in the drawing), in particular a base end of a major lower arm thereof. A cross member 5c extends laterally across the sub frame 5. The sub frame 5 also supports an engine via brackets 5b of which only one of them is shown in FIG. 3. The sub frame 5 of this embodiment is used not only for supporting the engine and wheel suspension systems but also for absorbing the impact of a vehicle crash as described hereinafter.

The shape of the inner recess defined by the holder 12 closely conforms to the outer circumferential surface of the corresponding part of the sub frame 5 so that the sub frame 5 can be frictionally retained by the holder 12 by suitably selecting the fastening force of the threaded bolts 15. It is preferable to interpose a lubricating plastic member between the inner surface of the holder 12 and the part of the sub frame 5 frictionally retained by the holder 12, and fasten the threaded bolts 15 so that the sub frame 5 may be retained by a prescribed retaining force. This retaining force is selected to be smaller than the load that will cause a buckling deformation of the sub frame 5 when it is applied to the front end of the sub frame 5. In other words, the sub frame 5 is adapted to move rearward with respect to the vehicle body when subjected to a load resulting from a frontal vehicle crash, instead of undergoing a buckling deformation, until the sub frame 5 or the connecting member 6 collides with a member which is capable of withstanding the reaction from the buckling deformation of the sub frame 5.

For this purpose, a stopper 14 is fixedly attached to the floor member 2 at a certain distance from the rear end of the connecting member 6 so that the connecting member 6 collides with the stopper 14 when the connecting member 6 has moved rearward by a prescribed distance in an intermediate phase of a frontal vehicle crash. The collision of the connecting member 6 with the stopper 14 creates a reverse deceleration to the connecting member 6 and the seat 8 attached to it.

Figure 4:
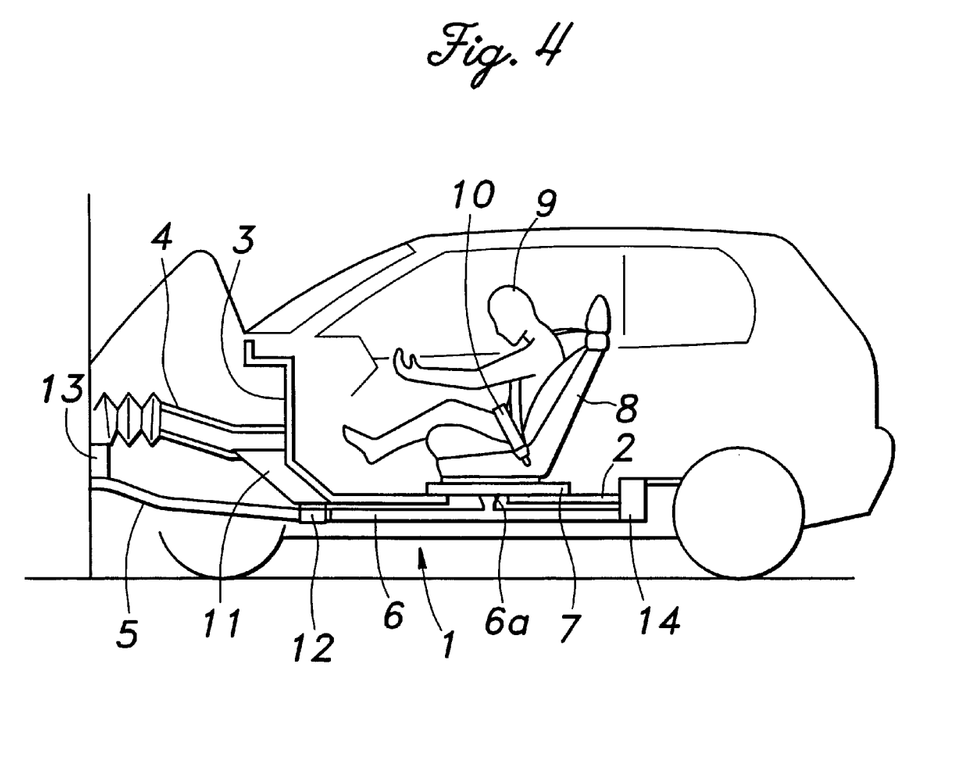
FIG. 4 is a view similar to FIG. 1 showing the mode of operation of the first embodiment of the present invention.

The action of the present invention is described in the following by taking an exemplary case of a frontal crash of the vehicle onto an object on the road with reference to FIG. 4.

Immediately following a vehicle crash, the front ends of the front side beams 4 and sub frame 5 are both subjected to an impulsive load. Because the rear end of the sub frame 5 is only frictionally engaged by the holders 12 as mentioned earlier, input of a large crash load causes the sub frame 5 to slide rearward relative to the holders 12 while the front side beams 4 undergo a compressive or buckling deformation. Thus, the seat 8 which is fixedly attached to the sub frame 5 via the connecting member 6 decelerates more sharply and strongly (interval a in FIG. 14) than the main frame 1 which is directly connected to the front side beams 4. At this time, in appearance, the seat 8 moves rearward relative to the floor member 2 which continues to move forward owing to the compressive deformation of the front side beams 4.

The occupant tends to move forward under the inertia force during this phase, but the restraint of the seat belt 10 prevents the forward movement of the vehicle occupant 9.

In an intermediate phase of the vehicle crash, the sub frame 5 having a front end which has been relatively intact in spite of the relatively high deceleration acting thereon eventually collides with the stopper 14 via the rear end of the connecting member 6. This causes a force opposing the crash load acting on the sub frame 5 to be transmitted to the seat 8 via the connecting member 6. The forward acceleration resulting from this collision cancels the forward inertia force acting on the vehicle occupant 9 (first half of interval b in FIG. 14). Also, the stopper 14 is firm enough to withstand the impulsive load which will cause a compressive or collapsing deformation of the sub frame 5.

In a final phase of the crash, as soon as the deformation stress of the sub frame 5 is added to the deformation stress of the front side beams 4, the deceleration acting on the vehicle body suddenly increases (second half of interval b in FIG. 14), and, thereafter, the floor member 2 and seat 8 decelerate in a single body, and the relative speed between the floor member 2 and seat 8 reduces to zero. At this time point, because the restraining load of the seat belt 10 balances with the deceleration in the final phase of the crash, the vehicle occupant 9 continues to decelerate in a single body with the floor member 2 and seat 8 until the vehicle body comes to a complete stop (interval c of FIG. 14).

Thus, the crash load at the time of a frontal vehicle crash is transmitted to the sub frame 5 in the early phase of the crash, but not so much to the floor member 2 which is part of the vehicle body. Therefore, the sub frame 5 simply moves rearward, instead of undergoing a buckling deformation. Only after the connecting member 6 has collided with the stopper 14 and subjected to the resulting forward acceleration, the seat 8 is allowed to decelerate in a single body with the vehicle body main frame 1.

According to the present invention, the mode of guiding the rearward movement of the crash load transmitting member (sub frame 5 and connecting member 6 in the foregoing embodiment) relative to the main frame 1 is not limited by the above illustrated embodiment, but may consist of any other structure which joins the crash load transmitting member to the main frame so as to allow a relative displacement between them to take place at a crash load which is lower than that would cause a buckling or compressive deformation of the crash load transmitting member.

Figure 5:
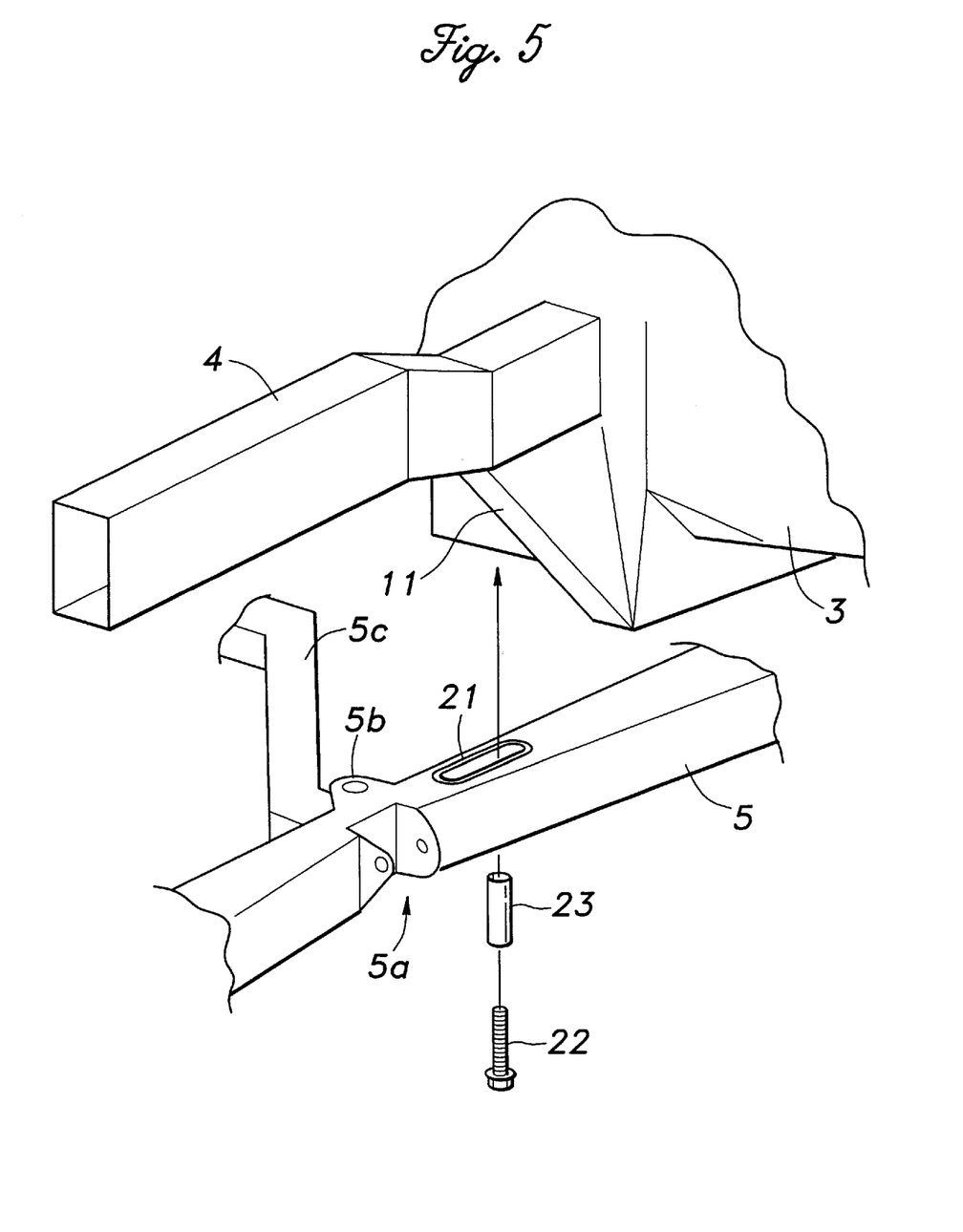
FIG. 5 is view similar to FIG. 3 showing a second embodiment of the present invention.

A second embodiment of the present invention is described in the following with reference to FIG. 5. The parts corresponding to those of the previous embodiment are denoted with like numerals.

In the second embodiment of the present invention, the guide member consists of a part of the sub frame 5 having a guide slot 21 formed therein. The guide slot 21 extends in the fore-and-aft direction. The sub frame 5 is mounted on the under surface of the floor frame member 11 by a threaded bolt 22 passed through the slot 21. To control the friction between the bolt 22 and the inner surface of the slot 21, a collar 23 is fitted onto the threaded bolt 22. Preferably, the inner surface of the slot 21 and/or the upper surface of the sub frame 5 which abuts the lower surface of the floor frame member 11 may be lined with a suitable friction material to control the friction with the corresponding parts. At any even, the sub frame 5 is retained by the floor frame member 11 with a retaining force which is less than that required for supporting the bucking or compressive deformation of the sub frame 5, and the rearward movement of the sub frame 5 is guided by the cooperation between the slot 21 and the threaded bolt 22. This embodiment provides similar advantages as those provided by the previous embodiment, and produces a deceleration time history at the time of a vehicle crash similar to that of the previous embodiment.

Figure 6:
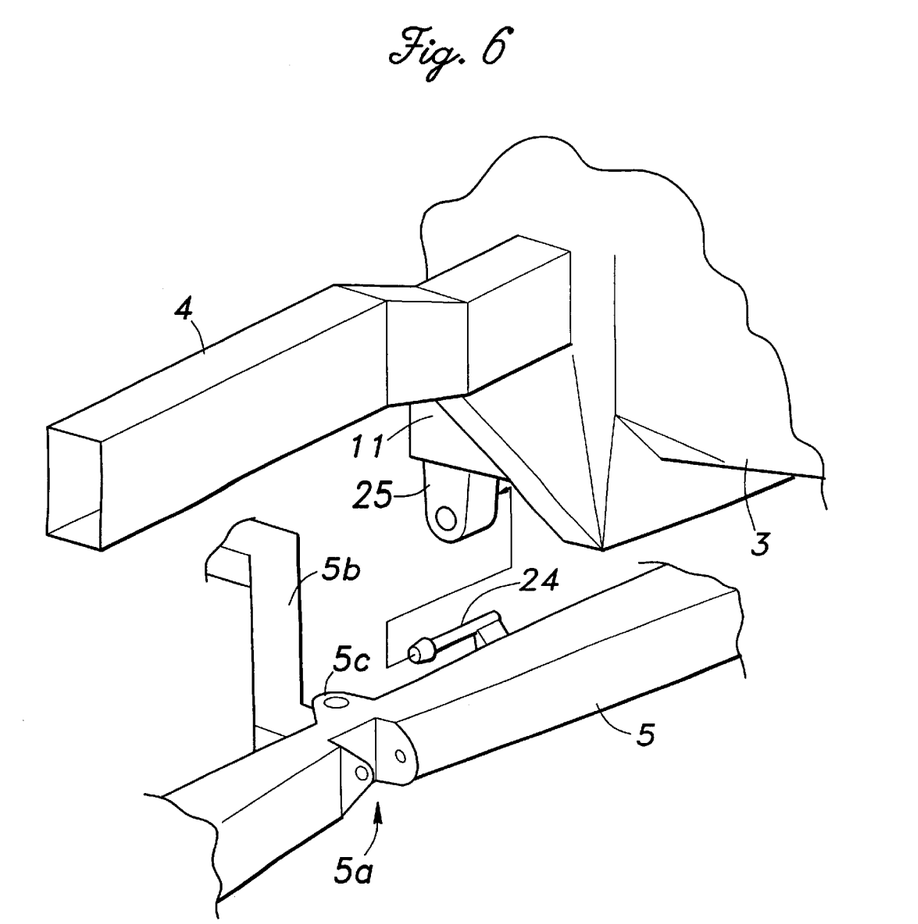
FIG. 6 is view similar to FIG. 3 showing a third embodiment of the present invention.
Figure 7:
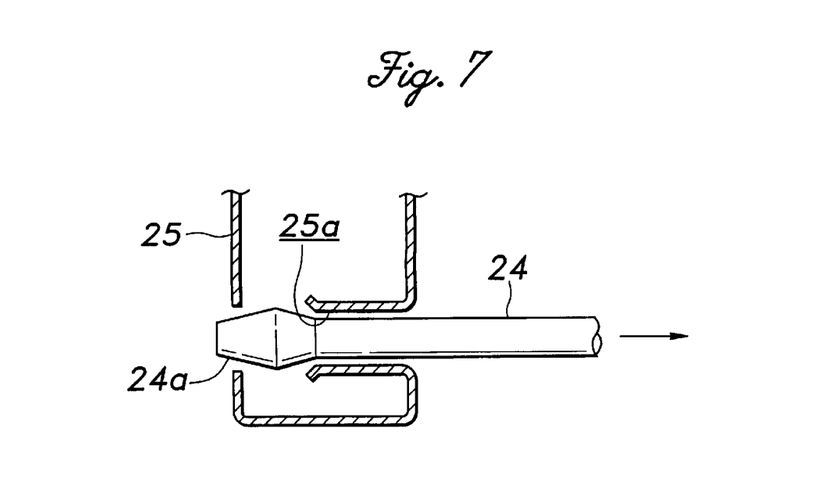
FIG. 7 is a fragmentary sectional view showing a part of the third embodiment of the present invention.

A third embodiment is described in the following with reference to FIGS. 6 and 7, and the parts corresponding to those of the previous embodiments are denoted with like numerals. In the third embodiment, a pin 24 integrally extends from the sub frame 5 in the forward direction. A hollow holder 25 is fixedly attached to the under side of the floor frame member 11. The free end of the pin 24 is provided with an enlarged head 24a. The holder 25 is provided with a funnel shaped insertion hole 25a which is adapted to resiliently expand when the head 24a is pushed thereinto and retain the head 24a therein with a certain retaining force which opposes the effort to pull the head 24a rearward as indicated by the arrow in the drawing. This retaining force is again smaller than the force that will be required to cause a buckling or compressive deformation of the sub frame 5. This embodiment also provides similar advantages, and a similar deceleration waveform at the time of a vehicle crash.

Figure 8:
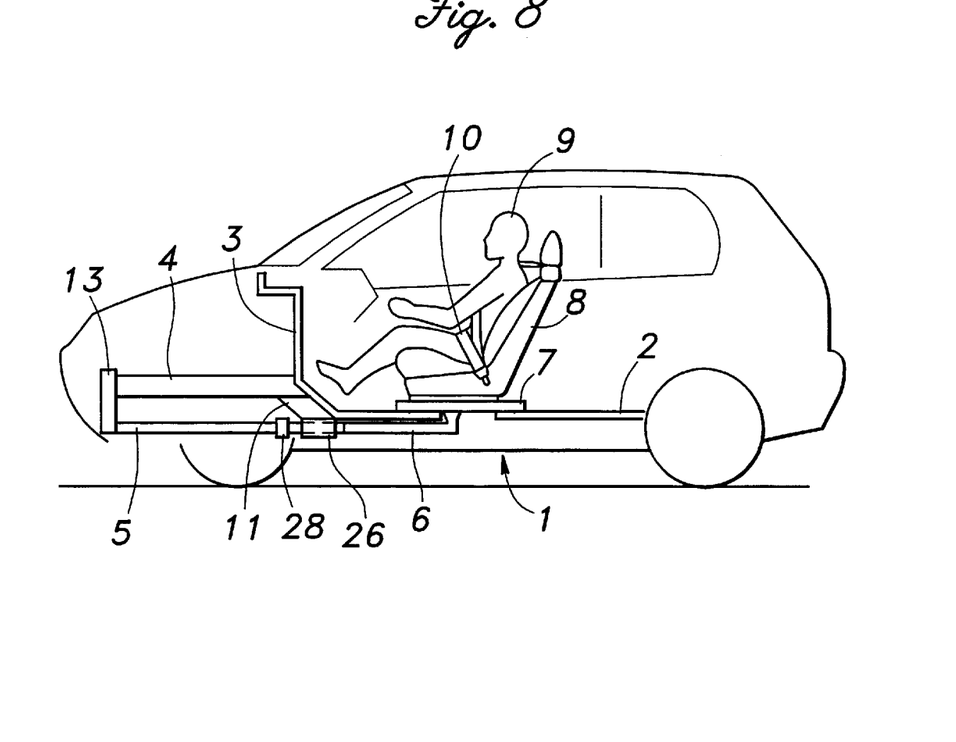
FIG. 8 is view similar to FIG. 1 showing a fourth embodiment of the present invention.
Figure 9:
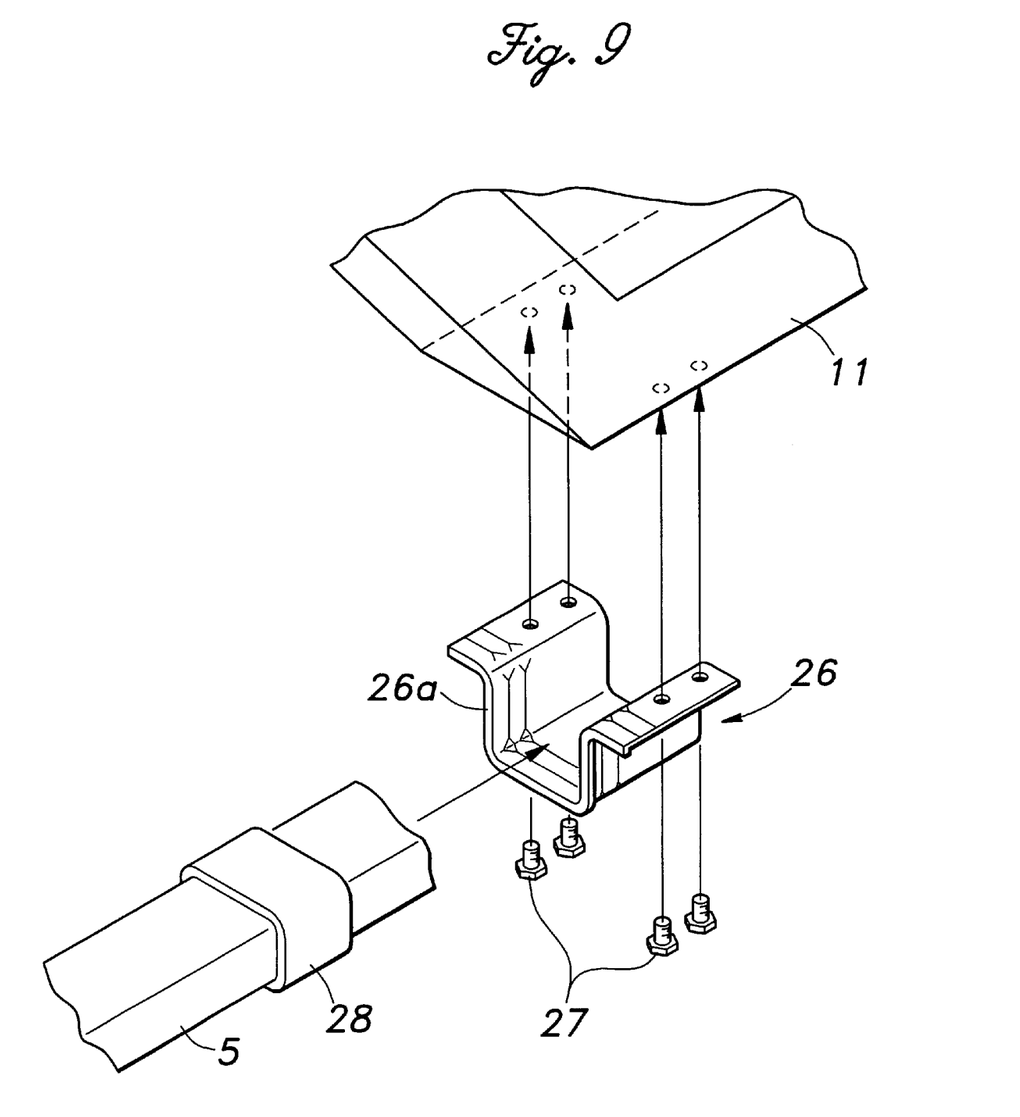
FIG. 9 is an exploded perspective view of an essential part of the fourth embodiment of the present invention.

FIGS. 8 and 9 show a fourth embodiment of the present invention. The parts corresponding to those of the previous embodiments are denoted with like numerals. This embodiment is similar to the first embodiment, but the connecting member 6 extends only to a middle part of the passenger compartment. In this case, the holder 26 frictionally engages the sub frame 5 in a similar manner as the first embodiment, but additionally serves as a stopper in cooperation with a bulge member 28 attached to a part of the sub frame 5 which is located ahead of the holder 26 by a prescribed distance. The bulge member may consist of any unitary or separate enlarged part of the sub frame 5. The holder 26 is provided with a front end 26a which is adapted to undergo a compressive or buckling deformation as the sub frame 5 moves rearward under an impulsive load resulting from a vehicle crash before holding the sub frame 5 stationary with respect to the main frame 1. The front end 26a of the holder 26a serves as a cushioning member which prevents a sharp change in the deceleration of the sub frame 5. In this case also, the frictional retaining force and the reaction force resulting from the compressive or buckling deformation of the front end 26a of the holder 26 are each lower than the force that is required to cause a buckling or compressive deformation of the sub frame 5.

Figure 10:
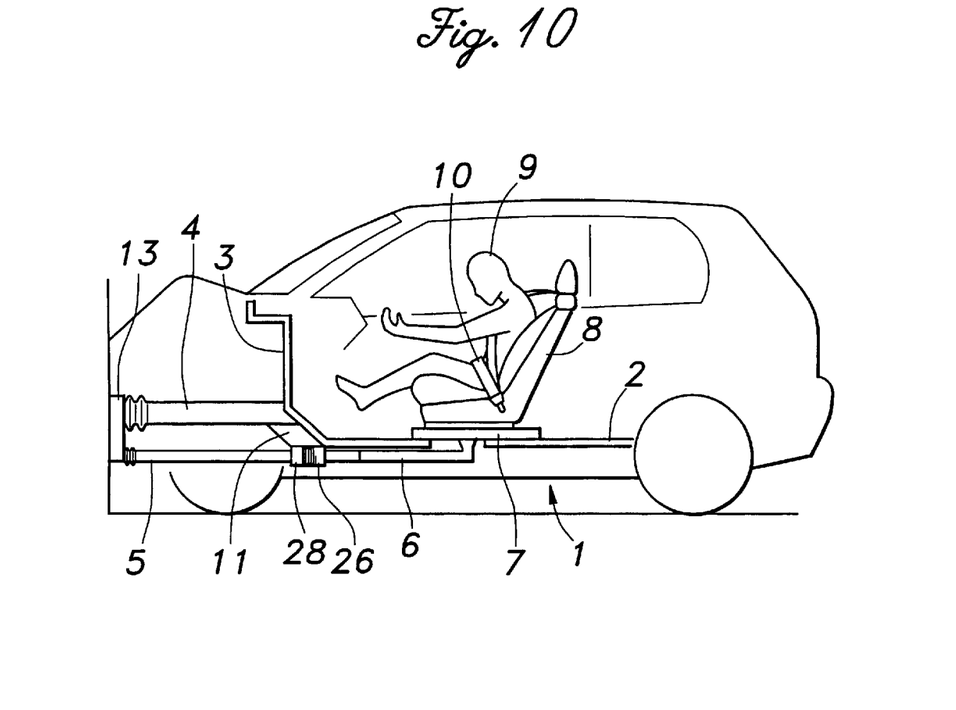
FIG. 10 is a view similar to FIG. 8 showing the mode of operation of the fourth embodiment of the present invention.

The action of the present invention is described in the following by taking an exemplary case of a frontal crash of the vehicle onto an object on the road with reference to FIG. 10.

Immediately following a vehicle crash, both the front side beams 4 and sub frame 5 are subjected to an impulsive load, and start deformation. Because the sub frame 5 remains relatively intact as opposed to the front side beams 4 which undergoes a buckling or compressive deformation to a more significant extent. As a result, the seat 8 which is fixedly attached to the sub frame 5 via the connecting member 6 decelerates more sharply and strongly than the vehicle body main frame 1 (interval a of FIG. 14). As a result, the seat 8, in appearance, moves rearward relative to the floor member 2 which continues to move forward as the front side beams 4 undergo a bucking or compressive deformation.

At this time, the vehicle occupant 9 tends to move forward under the inertia force, but the restraining force of the seat belt 10 acting on the vehicle occupant 9 increases and prevents the occupant 9 from moving forward.

In an intermediate phase of the crash, the bulge member 28 which is fixedly attached to the sub frame 5 collides with the holder 26, the former being subjected to a high deceleration with its front end withstanding the load. The inertia force of the main frame 1 is eventually transmitted to the bulge member 28, and the resulting impulsive load causes a buckling deformation of the front end 26a of the holder 26. The relative movement between the main frame 1 (including the front side beams 4 and floor member 2) and the connecting member 6 (including the seat 8) continues until the holder 26 has completed its buckling deformation. As a result, the reaction force to the crash load acting on the front side beams 4 is applied to the seat 8 via the connecting member 6 and with a certain cushioning effect, and the resulting forward acceleration partly cancels the forward inertia force acting on the vehicle occupant 9 (first half of interval b in FIG. 14).

In a final phase of the crash, as soon as the deformation stress of the sub frame 5 is added to the deformation stress of the front side beams 4, the deceleration of the vehicle body suddenly increases (second half of interval b in FIG. 14), and, thereafter, the floor member 2 and seat 8 decelerate in a single body, and the relative speed between the floor member 2 and seat 8 reduces to zero. At this time point, because the restraining load of the seat belt 10 balances with the deceleration of the vehicle occupant in the final phase of the crash, the vehicle occupant 9 continues to decelerate in a single body with the floor member 2 and seat 8 until the vehicle body comes to a complete stop (interval c of FIG. 14).

According to this structure, because the stopper (holder 26 and bulge member 28) for the crash load transmitting member (the sub frame 5 and connecting member 6) is provided in a part of the vehicle body which can readily provide an adequate rigidity such as the engine room (of a front engine vehicle), the restriction on the design of the passenger compartment can be minimized, and the freedom in the design of the vehicle body can be increased with the added advantage of optimizing the distribution of the vehicle body rigidity. As compared to the arrangement in which the colliding parts are provided in a rear end of the vehicle body, and are suitably reinforced for a higher rigidity as was the case with the first to third embodiments, the arrangement for the stopper can be made both compact and light-weight.

Figure 11:
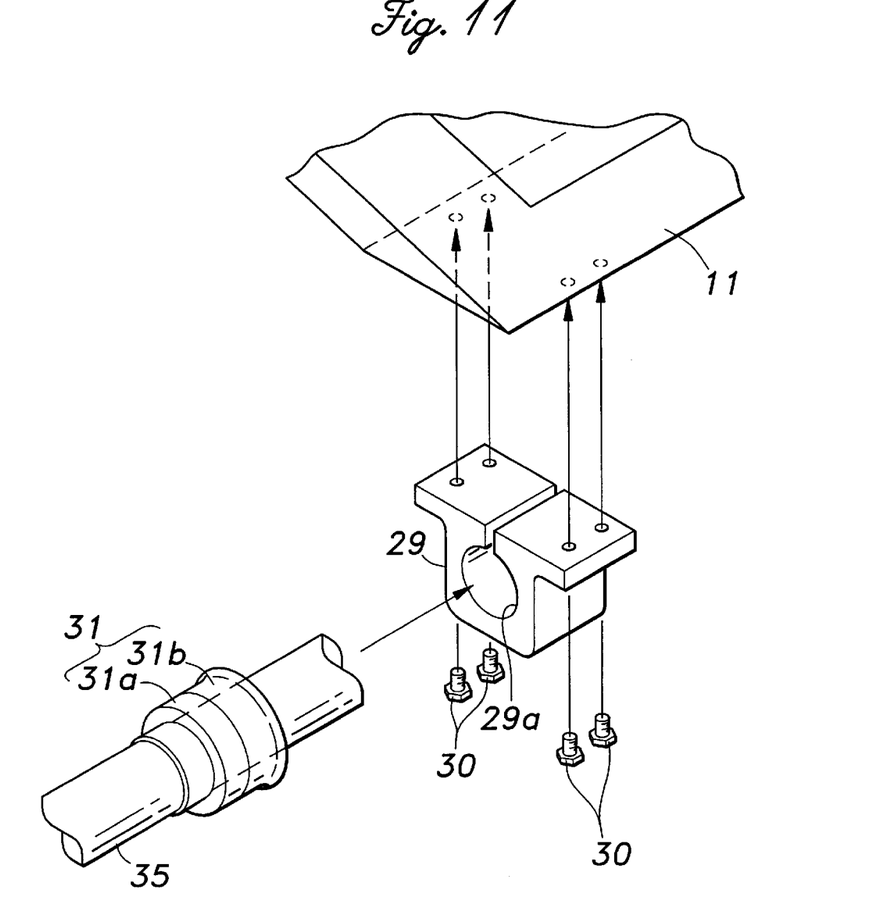
FIG. 11 is an exploded perspective view of an essential part of a fifth embodiment of the present invention.

FIG. 11 shows a fifth embodiment of the present invention, and the parts corresponding to those of the previous embodiments are denoted with like numerals. In this embodiment, a pair of lower front side beams 35 are provided under the engine room on either side of the vehicle body, instead of a sub frame. Each lower front side beam 35 is passed through an inner bore 29a defined by a holder 29 which is made of a relatively solid member and firmly attached to the floor frame member 11 by threaded bolts 30. A collar 31 is fitted onto the lower front side beam 35 at a point which is located ahead of the holder 29 by a prescribed distance. The collar 31 includes a relatively solid base end 31a which is firmly secured to the lower front side beam 35, and an extension 31b which extends from the base end 31a toward the holder 29, and is adapted to undergo a compressive or buckling deformation when it is pushed onto the holder 29.

Figure 12:
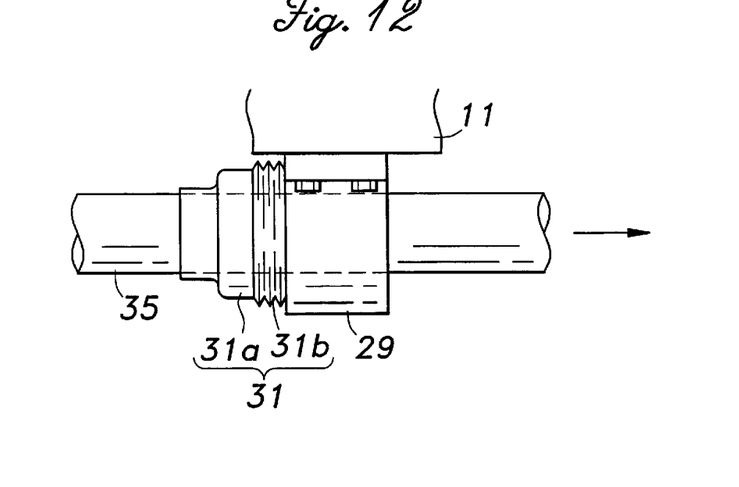
FIG. 12 is a fragmentary side view showing the mode of operation of the fifth embodiment of the present invention.

According to this embodiment, at the time of a frontal vehicle crash, the lower front side beam 35 initially moves rearward along with the connecting member 6 and the seat 8 which are integral with the lower front side beam 35 in the same way as in the previous embodiment while the upper front side beams 4 undergo a compressive or buckling deformation. As the lower front side beams 35 have moved rearward by the prescribed distance, the extension 31b abuts the holder 29, and collapses by undergoing a compressive or buckling deformation as illustrated in FIG. 12. As soon as the extension 31b has entirely collapsed, the base end 31a abuts the holder 29, and this causes the lower front side beams 35 to move jointly with the main frame 1. The action and effect of this embodiment are similar to those of the previous embodiments, and a similar deceleration time history can be achieved at the time of a vehicle crash as the previous embodiments.

Figure 13:
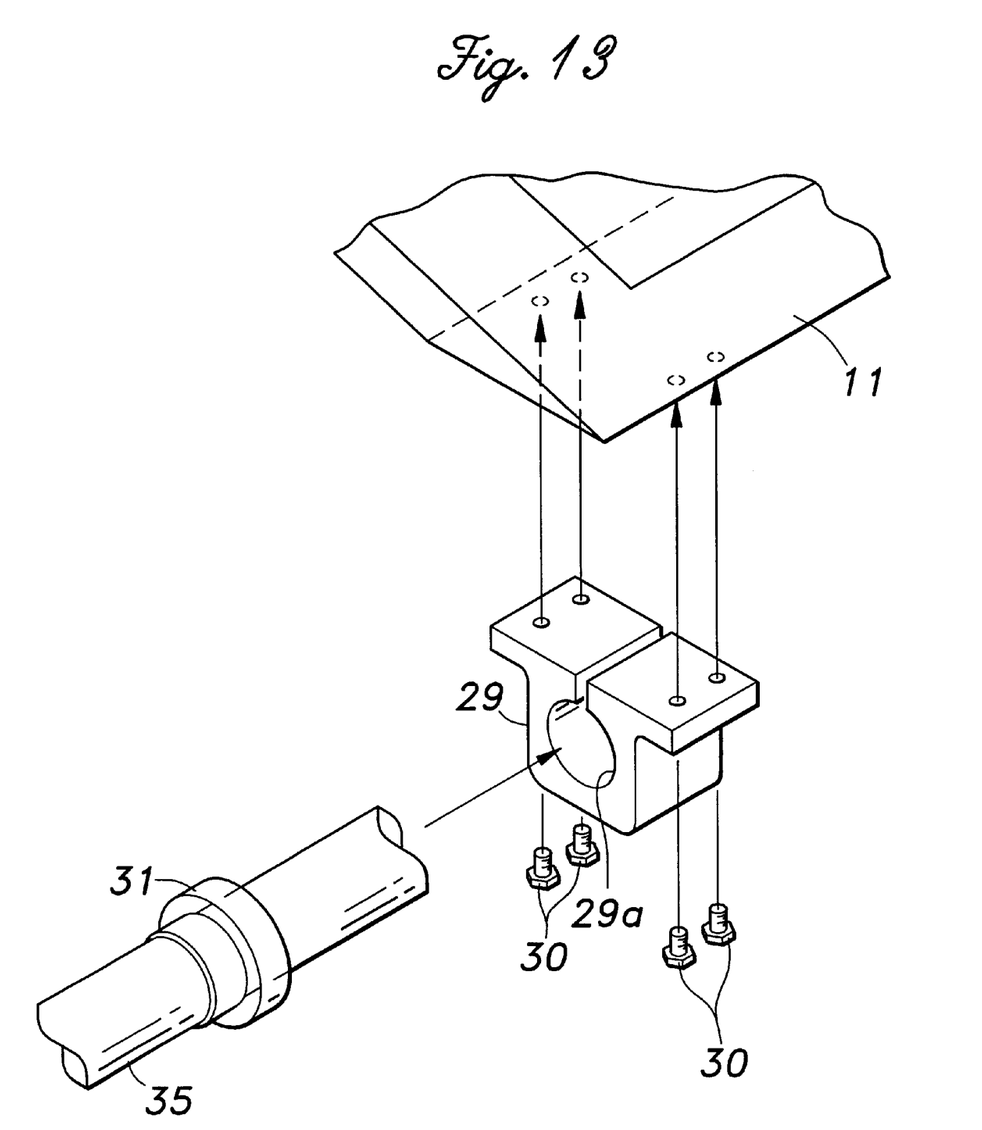
FIG. 13 is view similar to FIG. 1 showing a sixth embodiment of the present invention.

FIG. 13 shows a sixth embodiment of the present invention which is similar to the previous embodiment, but lacks the extension 31b extending from the base end 31a of the collar 31. Therefore, as the lower front side beams 35 move rearward and cause a sharp rise in the deceleration of the seat 8 which is attached to the front side beams 35 via a connecting member 6, it simply abuts the holder 29, and causes the lower front side beams 35 to move in a single body with the vehicle body main frame 1. The action and effect of this embodiment are similar to those of the previous embodiments, and a similar deceleration waveform can be achieved at the time of a vehicle crash as the previous embodiments.

Although the present invention has been described in terms of preferred embodiments thereof, it is obvious to a person skilled in the art that various alterations and modifications are possible without departing from the scope of the present invention which is set forth in the appended claims.

What is claimed is:

1. An automotive vehicle body structure, comprising
a vehicle body main frame including a floor member defining a floor of a passenger compartment, a dashboard panel extending upright from a front end of the floor member, and a pair of front side beams extending between a front end of the vehicle body and the dashboard panel;
a crash load transmitting member extending from a front end of the vehicle body to a portion of the crash load transmitting member adjacent to the floor member;
a vehicle seat connected to the crash load transmitting member;
a guide member fixedly attached to the vehicle body main frame, the guide member retains the crash load transmitting member by a retaining force that allows the crash load transmitting member to move rearward of the vehicle body when the crash load transmitting member is subjected to a rearward force exceeding a prescribed threshold level; and
a stopper which is fixedly attached to the vehicle body main frame, and abuts a part of the crash load transmitting member upon a rearward movement of the crash load transmitting member by a prescribed distance;
the prescribed threshold level being smaller than a level that will cause a collapsing deformation of the crash load transmitting member.

2. An automotive vehicle body structure according to claim 1, wherein said stopper is located adjacent to a lower end of said dashboard panel.

3. An automotive vehicle body structure according to claim 1, wherein said guide member is located adjacent to a lower end of said dashboard panel, and an enlarged part is provided in a part of said crash load transmitting member ahead of said guide member by said prescribed distance so that the guide member may serve as said stopper which abuts said enlarged part as said crash load transmitting member moves rearward by said prescribed distance.

4. An automotive vehicle body structure according to claim 3, wherein a cushioning member is provided between said guide member and said enlarged part of said crash load transmitting member.

5. An automotive vehicle body structure according to claim 4, wherein said cushioning member comprises a plastically collapsible extension of said enlarged part.

6. An automotive vehicle body structure according to claim 4, wherein said cushioning member comprises a plastically collapsible extension of said guide member.

7. An automotive vehicle body structure according to claim 1, wherein said stopper is provided adjacent to a rear end of said floor member.

8. An automotive vehicle body structure according to claim 1, wherein said crash load transmitting member comprises a sub frame that supports at least one of an engine and a wheel suspension system.

9. An automotive vehicle body structure according to claim 1, wherein said guide member comprises a channel shaped bracket which surrounds a part of said crash load transmitting member.

10. An automotive vehicle body structure according to claim 1, wherein said guide member comprises a rod which is passed through a longitudinal slot formed in one of said main frame and said crash load transmitting member and secured to the other of said main frame and said crash load transmitting member so as to achieve a prescribed frictional retaining force.

11. An automotive vehicle body structure according to claim 1, wherein said guide member comprises a rod which extends in the fore-and-aft direction from one of said main frame and said crash load transmitting member, and a hole formed in the other of said main frame and said crash load transmitting member to receive and retain said rod with a prescribed retaining force.

* * * * *